United States Patent [19]
Dobson

[11] 3,914,924
[45] Oct. 28, 1975

[54] APPARATUS FOR REMOVING TASSELS FROM PLANT STALKS

[76] Inventor: Ora B. Dobson, Ralston, Iowa 51459

[22] Filed: Apr. 8, 1974

[21] Appl. No.: 459,004

[52] U.S. Cl. .................................. 56/63; 171/58
[51] Int. Cl.² ............................... A01D 45/02
[58] Field of Search ......... 56/63, 51, 56, 14.1, 14.2, 56/104–106; 171/58

[56] References Cited
UNITED STATES PATENTS

| | | | |
|---|---|---|---|
| 1,042,704 | 10/1912 | Marshel | 171/58 X |
| 1,179,767 | 4/1916 | Siegfus | 171/58 X |
| 3,054,460 | 9/1962 | Steketee | 171/58 |
| 3,462,928 | 8/1969 | Schreiner et al. | 56/104 |
| 3,712,035 | 1/1973 | Gildersleeve | 56/63 |
| 3,736,730 | 6/1973 | Dobson | 56/63 |

*Primary Examiner*—J. N. Eskovitz
*Attorney, Agent, or Firm*—Henderson & Strom

[57] ABSTRACT

Apparatus for removing tassels from plant stalks including a pair of rotatable members of a novel construction. The rotatable members have a spoke-like resilient wire frame construction with a continuous strand of plastic twine weaved between and around the spokes to thereby form a textured surface which readily and positively grasps the tassels of plant stalks. The placement and overall configuration of the rotatable members forces the rotatable members together at a lower bottom portion thereof more tightly and with a larger surface area than has heretofore been possible. A drive mechanism for the rotatable members takes the form of a pair of bevel gears mounted on hubs attached to the center of the rotatable members. A third gear-like device is alternatively shaft or belt powered.

13 Claims, 6 Drawing Figures

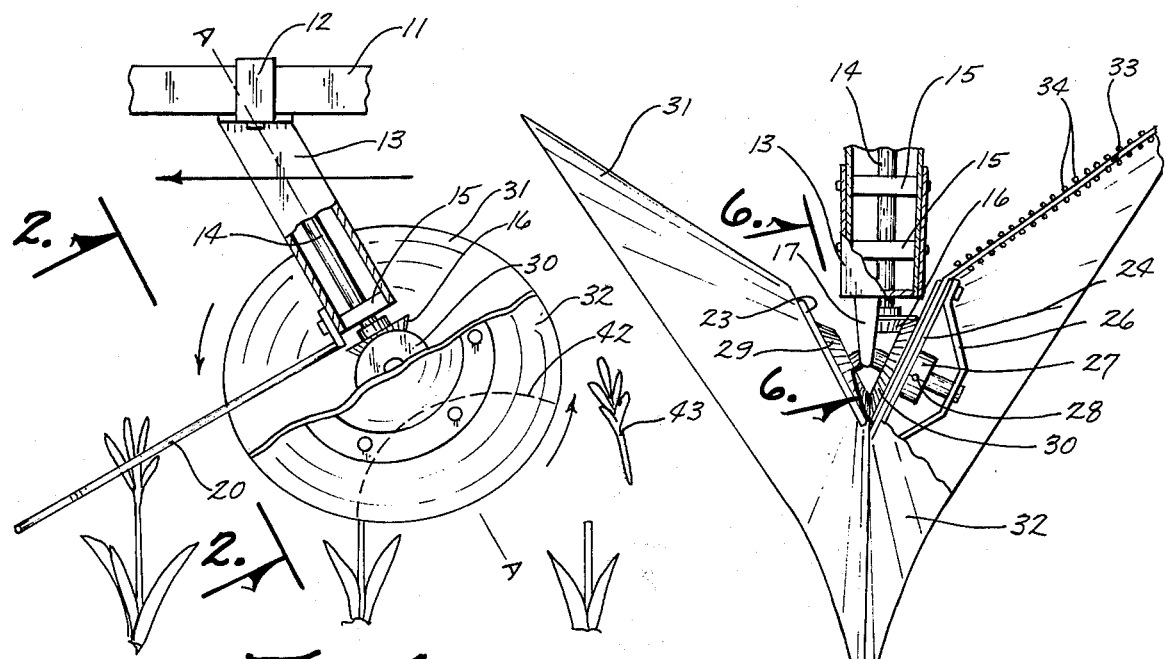

APPARATUS FOR REMOVING TASSELS FROM PLANT STALKS

BACKGROUND OF THE INVENTION

The present invention relates generally to a device for removing tassels from plant stalks, and more particularly to such a device with an improved tassel grasping mechanism and an improved power transfer system.

It is a common practice in the hybrid seed corn industry to remove the tassels from selected rows of corn stalks in a seed cornfield. The tassel removal is preferably done in a manner that removes most or all of the tassels but causes a minimum amount of plant damage.

The most common technique of detasseling corn has been hand removal, but in recent years various mechanized machines have been developed to pull tassels. One of the most effective machines of this type is shown in U.S. Pat. No. 3,736,730 to Ora B. Dobson. The development of this patented apparatus was necessary because the prior art machines could not be counted upon to pull the needed percentage of the selected tassels which were needed to achieve proper seed corn production. If a tassel pulling machine does not pull 99% or more of the selected tassels, a follow-up hand removal operation is normally necessary in order to achieve proper seed corn production.

A problem in the prior art tassel pulling machines has been to find an apparatus which will firmly and positively grasp and pull tassels without injuring the plant itself. Another problem has been the one of achieving a structure which is not so unduly bulky that it will not fit between corn rows which are planted close together. Still another problem in the prior art has been to find a machine which is easily adjustable to most any set of working conditions, without having unduly complicated devices or lengthy procedures which normally require taking the machine mechanism out of gear while such adjustments are made.

SUMMARY OF THE INVENTION

The present invention relates to a pair of rotatable members of a frusto-conical configuration, which are disposed to relatively deform each other at the lower rear portion thereof. The rotatable members are arranged so as to rotate together in the same direction. Spokes eminating from a central hub form the framework for a textured plastic twine strand which is weaved around the spokes to form a surface which will readily grasp tassels to be removed from plant stalks.

A novel arrangement moves the respective rotatable members so as to grasp and pull tassels from plant stalks. Bevel gears are rigidly affixed to the central hubs. In one arrangement of the invention, the bevel gears inter-mesh so as to insure that the rotatable members move at the same rate, without any slippage with respect to each other. Also, a driving bevel gear, which operatively engages one of the driven bevel gears which in turn is attached to one of the rotatable members, serves to drive both rotatable members simultaneously, because of the meshing arrangement of the bevel gears on the respective central hubs of the rotatable members.

Alternatively, the bevel gears on the central hub do not mesh together, but mesh with gear teeth on each side of a central pulley shaped member. The pulley shaped member is belt driven which, in turn, drives the rotatable members simultaneously at the same rate of speed.

An object of the present invention is to provide a tassel pulling apparatus which is effective to do a complete job of pulling tassels without doing an inordinate amount of damage to the plant itself.

Another object of the invention is to provide an improved grasping surface for a tassel pulling machine.

A further object of the invention is to provide a structure which has a larger effective tasseling pulling surface than has been heretofore possible.

Still another object of the invention is to provide an improved structure for biasing rotatable members of a tassel pulling machine together to thereby increase the holding pressure on the tassels and thereby the certainty that the tassels are completely pulled.

A still further object of the invention is to achieve a pulling motion on tassels which is substantially upwardly directed.

Another object of the present invention is to provide a tassel pulling device having rotatable members which do not slip with respect to each other but rather move at a constant rate with respect to each other.

Still another object of the invention is to provide a tassel pulling machine which is easily adjustable without taking the machine out of gear.

Other objects, advantages, and novel features of the present invention will become apparent from the following detailed description of the invention when considered in conjunction with the accompanying drawings.

BRIEF DESCRIPTION OF THE DRAWINGS

FIG. 1 is a side elevational view of a portion of the tassel pulling mechanism of the present invention with a portion of one rotatable member omitted to reveal the working parts of the device;

FIG. 2 is a view of the device shown in FIG. 1 taken along lines 2—2 in FIG. 1, but with a portion of the rightmost rotatable member removed and shown in cross-section;

FIG. 3 is a view of one of the rotatable members showing the weave-like construction in a section thereof but showing the rest of the rotatable member only schematically;

FIG. 4 is a view taken along lines 4—4 of FIG. 3 and shows the end view of the weave-like construction of the present invention;

FIG. 5 shows an alternate embodiment of the powering means of the invention similar to that shown in FIG. 2; and FIG. 6 is a view taken along lines 6—6 of FIG. 2.

DESCRIPTION OF THE PREFERRED EMBODIMENTS

Referring now to the drawings, wherein like reference numerals designate identical or corresponding parts throughout the several views, and more particularly to FIG. 1 which shows the detasseling apparatus moving from right to left, in the process of removing tassels.

Tassel removing apparatus 10 is connected to a high clearance machine or other prime mover (not shown) having a frame 11 to which a bracket 12 is secured to accomplish the mounting. Within a housing 13 is rotatably mounted a shaft 14, within bearings 15. Upon the end of the shaft 14 is mounted a bevel gear 16. Also mounted on the housing 13 is a shield member 17, to which is rigidly attached a cross member 18 (FIG. 6). To the cross member 18 is rigidly attached axles 21 and 22. This connection is preferably made by welding but, of course, other fastening means may be used.

Hub mechanisms 23 and 24 are rotatably mounted on axles 21 and 22 respectively. A spider shaped support member 26 is connected to each of the hubs 23 and 24 as can best be seen in FIG. 2. These spider shaped support members rotate at the center thereof on axles 22 and 23. A collar 27 is rigidly connected to the axles 21 and 22 by such means as a set screw 28. This collar 27 serves to prevent the hub section from being displaced beyond the point on the axles 21 and 22 that they are desired to be positioned.

A first gear mechanism 29 is rigidly connected to the hub 23 and meshes with a second gear mechanism 30 on hub 24, at the bottom of first and second gear means 29 and 30. Because of this meshing of first and second gear mechanisms 29 and 30, these gear means 29 and 30 must move together at a common speed.

Bevel gear 16 meshes on one side thereof with the top side of second gear means 30. Consequently, when rotatable shaft 14 is rotated, the resultant movement causes the second gear means 30 to rotate, which, because of the meshing of first and second gear means 29 and 30, causes the first gear means 29 to likewise rotate. Rotatable members 31 and 32 are connected respectively to hubs 23 and 24 and rotate therewith.

Referring to FIGS. 2–5, it can be seen that spokes 33 extend radially from the central hub portion 23 of the rotatable members. Plastic twine 34 is tied to one of the spokes (this knot is not shown) and the twine is then weaved through the spokes 33 in a circular or spiral fashion until the entire length of the spokes 33 is covered with a weave-like formation of plastic twine. This plastic twine 34 is of a conventional type normally used for baling hay used for livestock feed. The weave-like configuration can be seen clearly in FIG. 4 wherein the twine 34 is first weaved over one spoke 33 and under the next spoke 33 in a sequential pattern. The result of this weaving is a textured resilient surface which has proven to be highly effective in grasping tassels in tassel pulling machines. Preferably an odd number of spokes 33 are used such that for each spoke, each successive turn of twine is on the other side (top or bottom) from that of the adjacent turn. Such is to say that if one turn goes over a particular spoke 33, the turn of twine before and after that turn will be below that same particular spoke 33.

FIG. 5 shows an alternate form for powering the rotatable members 31 and 32 of this detasseling machine. A housing 36 is connected to a high clearance machine (not shown), in a manner similar to that shown in FIG. 1. To the bottom side 37 of the housing 36 is mounted a shaft 38. Upon this shaft 38 is rotatably mounted a pulley shaped third gear mechanism 39, which has teeth 41 arranged in a circular fashion on each side thereof. First and second axles 21 and 22 are this time rigidly connected to the shaft 38, and serve to rotatably mount the hubs 23 and 24 respectively on rotatable members 31 and 32. As in the embodiment shown in FIG. 2, first and second gear means 29 and 30 are rigidly connected to the hubs 23 and 24 respectively. First and second gear means 29 and 30 are forced against the teeth 41 (FIG. 5) by collars 27, as were used in the embodiment of FIG. 2. Pulley-like member 39 is driven by a belt 40, which in turn is powered by a motor or other suitable means, not shown. This embodiment most readily adapts itself to adjustments without taking the mechanism out of gear, since it can easily be pivoted for example as shown along a line like A—A in FIG. 1, in the plane of the paper as seen in FIG. 1.

In operation, a high clearance machine having a frame 11 thereon moves in a corn field in a direction from right to left in the direction of the arrow as seen in FIG. 1. V-shaped bracket member 20 extends forwardly on the tassel pulling apparatus 10 and serves to insure that the tassels are guided directly into the V of the rotating members 31 and 32. The legs of the V of V-shaped bracket member 20 connect at the approximate point that member 20 is connected to housing 13, and are spaced from each other at the other ends thereof. The rotating members 31 and 32 both rotate simultaneously in a counterclockwise direction as viewed in FIG. 1 and indicated by the arrows. This movement is caused by the rotating shaft 14, which moves the bevel gear 16. This bevel gear 16 meshes with the second gear mechanism 30 and turns it in the proper and desired direction. Since first and second gear means mesh at the bottom thereof, this motion is transmitted to the first gear means such that first and second gear means 29 and 30 rotate positively and simultaneously together.

The desired area of contact which is shown by the dotted lines 42 in FIG. 1 is located on the lower rear side of the rotatable disc members 31 and 32. It is very important that this contact occur at this position to achieve the best results. As can be seen in FIG. 1 the tassel is grasped by the tassel pulling device just about directly at the bottom of these rotatable members 31 and 32. From that point onwardly there is an upward component of movement within the contact area such that the tassel is grasped more firmly and is pulled upwardly, which is far superior to a pulling method which pulls the corn stock to one side too great of a degree. Once the tassel is pulled, it is at a point in back of and on top of the dashed lines 42 and falls from the rear of the tassel pulling device 10 as shown by the loose tassel 43, shown dropping from the rear of the tassel pulling device 10 in FIG. 1.

This area of contact as defined by the dashed lines in 42 in FIG. 1 is larger than the contact areas of most prior art devices. The pressure holding discs 31 and 32 together and thereby deforming each of these rotatable members is due to the relative position of the members 31 and 32, and also to the resiliency in spokes 33, which are preferably made of number ten music steel. It can therefore be appreciated that the combination of the resilient weave-like construction of the plastic twine 34 within the spokes 33 serves a unique and improved tassel grasping function.

Obviously many modifications and variations of the present invention are possible in light of the above teachings. For example, other types of string and twine may be used instead of plastic baling twine. It is therefore to be understood that, within the scope of the appended claims, the invention may be practiced otherwise than as specifically described.

I claim:

1. In a device for removing tassels from plant stalks having a frame, a pair of rotatable members attached to said frame for contacting and pulling off the tassels, and drive means for said rotatable members, the improvement comprising:

a hub section in the center of each of said rotatable members;

a plurality of flexible spokes connected to said hub section and extending radially outwardly therefrom to an outer peripheral surface of said rotatable member; and twine means disposed on said spokes in a weave-like configuration.

2. The device of claim 1 wherein said twine means is made of a plastic material.

3. The device of claim 1 wherein said twine is made of a resilient material.

4. The device of claim 1 wherein an odd number of spokes extend outwardly from the hub section.

5. The device of claim 1 wherein said rotatable members are generally frusto-conical in shape.

6. The device of claim 1 having means for maintaining the bottom portions of said rotatable members in tight engagement by forcing only the bottom rear portions together to thereby elastically deform the spokes of the bottom rear portions of the rotatable members.

7. The device of claim 1 wherein the drive means comprises:

first and second bevel gear means attached to the hub section of each rotatable member and having means for engaging and turning said bevel gears to thereby rotate the rotatable members.

8. The device of claim 7 wherein said bevel gear means respectively engage each other.

9. The device of claim 7 wherein a bevel gear operatively engaging one of said bevel gear means is attached to means for turning said bevel gear.

10. The device of claim 9 wherein:

a shaft is connected to said bevel gear and is operatively connected to said means for turning the bevel gear;

a housing for holding said shaft;

at least one bearing surrounding said shaft within the housing;

guard means at least partially surrounding said bevel gear; and axles rigidly attached to said guard means along the axis of said rotatable members, the hub sections on each of said rotatable members being rotatably received on the respective axles.

11. The device of claim 7 wherein a third gear means engages each of said first and second gear means; and means for turning the third gear means is operatively connected to the third gear means.

12. The device of claim 11 wherein the third gear means is a pulley-shaped member with gear teeth on each side thereof, and said means for turning includes a pulley belt engaging said pulley-shaped member.

13. The device of claim 12 wherein a housing is connected to said third gear means;

a shaft means is rigidly connected to the housing for rotatably mounting the third gear means; and axles are rigidly attached to said housing along the axes of said rotatable members, the hub sections of each of said rotatable members being rotatably received on said respective axles.

* * * * *